United States Patent
Lefort et al.

(10) Patent No.: US 7,006,283 B2
(45) Date of Patent: Feb. 28, 2006

(54) THREE-DIMENSIONAL OPTICAL AMPLIFIER STRUCTURE

(75) Inventors: Laurent Lefort, Pontcharra (FR); Patrick Georges, Noisy le Roi (FR); Francois Balembois, Boissy le Sec (FR); Pierre Jean Devilder, Sainte Marie Du Mont (FR); Sebastien Forget, Arcueil (FR)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 11/104,026

(22) Filed: Apr. 12, 2005

(65) Prior Publication Data

US 2005/0195474 A1   Sep. 8, 2005

Related U.S. Application Data

(63) Continuation-in-part of application No. 10/342,437, filed on Jan. 13, 2003, now abandoned.

(60) Provisional application No. 60/649,227, filed on Feb. 2, 2005.

(30) Foreign Application Priority Data

Jan. 15, 2002  (CA) .................................. 2368031
Feb. 1, 2002  (CA) .................................. 2370037

(51) Int. Cl.
*H01S 3/00* (2006.01)
*H04B 10/12* (2006.01)

(52) U.S. Cl. ...................................... 359/347; 359/348
(58) Field of Classification Search ................ 359/347, 359/348
See application file for complete search history.

(56) References Cited

U.S. PATENT DOCUMENTS

| 3,460,046 | A | * | 8/1969 | Arnaud ........................ 372/94 |
| 5,268,787 | A | | 12/1993 | McIntyre .................... 359/347 |
| 5,546,222 | A | | 8/1996 | Plaessmann et al. ........ 359/346 |
| 5,615,043 | A | * | 3/1997 | Plaessmann et al. ........ 359/346 |
| 5,923,684 | A | * | 7/1999 | DiGiovanni et al. .......... 372/6 |
| 6,373,864 | B1 | * | 4/2002 | Georges et al. .............. 372/10 |
| 2002/0105997 | A1 | * | 8/2002 | Zhang ........................ 372/70 |

FOREIGN PATENT DOCUMENTS

DE          100 05 194 A1    8/2001

OTHER PUBLICATIONS

Druon et al., "High-Repetition-Rate 300-ps Pulsed Ultraviolet Source with a Passively Q-Switched Microchip Laser and a Multipass Amplifier", Optics Letters, vol. 24, No. 7, Apr. 1, 1999, pp. 499-501.

Olson et al., "Multipass Diode-Pumped Nd:YAG Optical Amplifiers at 1.06 $\mu$m and 1.32 $\mu$m", IEEE Photonics Technology Letters, vol. 6, No. 5, May 1, 1994, pp. 605-608.

(Continued)

*Primary Examiner*—Jack Keith
*Assistant Examiner*—Eric Bolda
(74) *Attorney, Agent, or Firm*—Allen, Dyer, Doppelt, Milbrath & Gilchrist, P.A.

(57) ABSTRACT

The present invention relates to a multi-pass three-dimensional amplifier structure in which a beam of light traverses an amplifier medium multiple times via distinct multiple paths. The distribution of the multiple paths being such that the volume occupied by the multiple paths inside the amplifier medium substantially overlaps with the volume of the amplifier medium being optically pumped by an optical pump beam. The distribution of the optical paths is such that no more than two of the multiple paths lie in a same plane. The astigmatism induced by anisotropic amplifying crystals is self-compensated by aligning the crystallographic axes of the amplifying crystal at a 45° angle to the longitudinal axis of the redirecting means.

22 Claims, 14 Drawing Sheets

OTHER PUBLICATIONS

Forget et al., "A New 3D Multipass Amplifier Based on Nd:YAG or Nd:YVO$^4$ Crystals", Applied Physics B, vol. B75, No. 4-5, Oct. 2002, pp. 481-485.

Forget et al., "New 3D Multipass Amplification Scheme Based on Diode-Pumped Nd:YAG or Nd:YVO$_4$ Crystals", Conference on Lasers and Electro-Optics (CLEO 2002), Technical Digest, vol. 73, May 19, 2002, pp. 390-391.

Scott et al., "Efficient high-gain laser Amplification from a Low-gain Amplifier by Use of Self-Imaging multipass Geometry", Applied Optics, vol. 40, No. 15, May 20, 2001.

Le Blanc et al., Compact and efficient multipass Ti:sapphire system for femtosecond chirped-pulse amplification at the terawatt level, Optics Letters, vol. 18, No. 2, Jan. 15, 1993.

Plaessmann et al., "Multipass Diode-pumped solid-state Optical Amplifier", Optics Letters, vol. 18, No. 17, Sep. 1, 1993.

A. Agnesi et al., "Efficient wavelength conversion with high power passively Q-switched diode-pumped neodymium laser", IEEE, Journal of Quantum Electronics, vol. 34, 1998, pp. 1480-1484.

J. J. Zayhowski et al., "Diode-pumped passively Q-switched picosecond microchip lasers", Optics Letters, vol. 19, 1994, pp. 1427-1429.

J. J. Zaykowski, "Ultraviolet generation with passively Q-switched microchip lasers", Optics Letters, vol. 21, 1996, pp. 588-590.

J. J. Zaykowski, "Non linear frequency conversion with passively Q-switched microchip lasers", Lasers and Electro-Optics, CLEO '96, paper CWA6, 1996, pp. 236-237.

B. Ferrand et al., "Liquid Phase Epitaxy: a versatile technique for the development of miniature optical components in single crystal dielectric media", Optical Materials 11, 101, 1998.

B. Braun et al., "56 PS passively Q-switched diode-pumped microchip laser", Optics Letters, 22, Mar. 15, 1997, pp. 381-383.

C. Larat et al., "High repetition rate solid-state laser for space communications", SPIE, vol. 2381, pp. 256-263.

J.E. Bernard et al., "High gain, diode-pumped Nd:YVO$_4$ slab amplifier", Optics Communications, vol. 109, Jun. 15, 1994, pp. 109-114.

D. P. Shepherd et al., "A diode-pumped, high gain, planar waveguide Nd:Y$_3$ Al$_5$ O$_{12}$ amplifier", Appl. Phys. Lett., 71, Aug. 18, 1997, pp. 876-878.

E. Rochat et al., "High power Nd-doped fiber amplifier for coherent intersatellite links", IEEE, Journal of Quantum Electronics, 35, 1999, 1419-1423.

I. Zawischa et al., "All solid-state neodymium-based single frequency master oscillator fiber power-amplifier system emitting 5.5 W of radiation at 1064 nm", Optics Letters, 24, Apr. 1, 1999, pp. 469-471.

G. J. Friel et al., "High gain Nd:YLF amplifier end-pumped by a beam shaped broad-stripe diode laser", Lasers and Electro-Optics, CLEO '96, paper CTUL 28, 1996, p. 144.

J. J. Degnan, "Optimal Design of Passively Q-Switched Microlaser Transmitters for Satellite Laser Ranging", Tenth International Workshop on Laser Ranging Instrumentation, Shanghai, China, Nov. 11-15, 1996.

* cited by examiner

THREE-DIMENSIONAL OPTICAL AMPLIFIER STRUCTURE

RELATED APPLICATIONS

The present application is a continuation-in-part of U.S. patent application Ser. No. 10/342,437 filed Jan. 13, 2003 now abandoned, which claimed priority from Canadian Patent Application No. 2,368,031 filed Jan. 15, 2002 and from Canadian Patent Application No. 2,370,037 filed Feb. 1, 2002, which are incorporated herein by reference for all purposes. The present application also claims priority from U.S. Patent Application No. 60/649,227 filed Feb. 2, 2005, which is incorporated herein by reference for all purposes.

FIELD OF THE INVENTION

The present invention relates to an optical amplifier, and in particular to a three-dimensional optically pumped amplifier structure for lasers.

BACKGROUND OF THE INVENTION

Production of short pulses with high energy per pulse is usually achieved by a combination of one oscillator and one amplifier. The oscillator is traditionally a mode-locked laser producing very short pulses, typically less than 100 ps, at high frequency, typically a few tens of MHz, and with low energy per pulse, typically a few nJ. To increase the pulse energy to several $\mu J$, an amplifier working at a lower repetition rate, ranging from a few kHz to a few hundreds of kHz depending on the pumping configuration, is used. Unfortunately, the traditional systems are complex and complicated to use because they involve active modulation (acousto-optic or electro-optic), high-speed electronics, short-pulse production for the oscillator, and injection and synchronization of the pulses inside the amplifier.

Passively Q-switched lasers using Nd-doped crystals can produce high peak power pulses of several kW at a wavelength of 1064 nm. Depending on the experimental setup, the pulse width can vary from a few tens of ns (A. Agnesi, S. Dell'Acqua, E. Piccinini, G. Reali and G. Piccinno, "Efficient wavelength conversion with high power passively Q-switched diode-pumped neodymium laser", IEEE, J. Q. E., Vol. 34, 1480–1484, 1998) to a few hundreds of ps (J. J. Zayhowski, "Diode-pumped passively Q-switched picosecond microchip lasers", Opt. Lett., Vol. 19, 1427–1429, 1994). For example, pulses of 19 ns and 108 $\mu J$ can be obtained at 25 kHz and 1064 nm from a diode-pumped Nd:YAG laser with a $Cr^{4+}$:YAG saturable absorber crystal. The high peak power of these lasers allows efficient wavelength conversion into the ultra-violet (UV) range with optically nonlinear materials (A. Agnesi, S. Dell'Acqua, E. Piccinini, G. Reali and G. Piccinno, "Efficient wavelength conversion with high power passively Q-switched diode-pumped neodymium laser", IEEE, J. Q. E., Vol. 34, 1480–1484, 1998; J. J. Zayhowski, "Diode-pumped passively Q-switched picosecond microchip lasers", Opt. Lett., Vol. 19, 1427–1429, 1994; J. J. Zaykowski, "UV generation with passively Q-switched microchip laser", Opt. Lett., Vol. 21, 588–590, 1996).

To reduce the pulse width, while using the same material combination, one must combine the active medium and the saturable absorber in a short distance to reduce the cavity length to about 1 mm. A microchip laser combines the two materials in a monolithic crystal (J. J. Zaykowski, "Non linear frequency conversion with passively Q-switched microchip lasers", CLEO 96, paper CWA6, 23 6–237, 1996) to reduce the energy to approximately 8 $\mu J$ at 1064 nm. The two materials, i.e. the laser material and the saturable absorber, can be connected by thermal bonding, or the saturable absorber can be grown by liquid phase epitaxy (LPE) directly on the laser material (B. Ferrand, B. Chambaz, M. Couchaud, "Liquid Phase Epitaxy: a versatile technique for the development of miniature optical components in single crystal dielectric media", Optical Materials 11, 101, 1998). At the same time, in order to obtain sub-nanosecond pulses, the saturable absorber must be highly doped to lower the repetition rate, e.g. 6–8 kHz with Nd:YAG. The wavelength conversion efficiency from infrared (IR) to UV is in the order of 4%. A solution to simultaneously obtain short pulses and a high repetition rate is to combine a $Nd:YVO_4$ crystal, whose short fluorescence lifetime is well suited for a higher repetition rate, with a semiconductor-based saturable absorber in an anti-resonant Fabry-Perot structure (B. Braun, F. X. Kdarner, G. Zhang, M. Moser, U. Keller, "56 PS passively Q-switched diode-pumped microchip laser", Opt. Lett. 22, 381–383, 1997). Unfortunately this structure is nevertheless complex and very difficult to produce.

It is therefore difficult to simultaneously produce sub-nanosecond short pulses, at frequencies of a few tens of kHz, with several micro-Joule per pulse in a simple and compact system. Another solution consists of combining a compact oscillator, producing short pulses at high frequency, with an amplifier to increase the pulse energy. Amplifiers have been used in the past with pulsed microlasers. After amplification, pulses with 87 nJ (small-signal gain of 3.5) at 100 kHz have been produced using a 10-W diode bar as a pump (C. Larat, M. Schwarz, J. P. Pocholle, G. Feugnet, M. Papuchon, "High repetition rate solid-state laser for space communication", SPIE, Vol. 2381, 256–263). A small-signal gain of 16 has been obtained with an 88-pass complex structure using two 20-W diode bars as a pump (J. J. Degnan, "Optimal design of passively Q-switched microlaser transmitters for satellite laser ranging", Tenth International Workshop on Laser Ranging Instrumentation, Shanghai, China, Nov. 11–15, 1996). In these two examples, the amplification efficiency, which can be defined as the ratio between the small-signal gain and the pump power, is small because the transverse pumping has a low efficiency due to the poor overlap of the gain areas with the injected beam. Furthermore, these setups use Nd:YAG crystals not suited for high-frequency pulses (the fluorescence lifetime is 230 $\mu s$).

A combination of Nd ions in two different hosts, in an oscillator-amplifier system, has been performed in the past in continuous wave (CW) (H. Plaesmann, S. A. Re, J. J. Alonis, D. L. Vecht, W. M. Grossmann, "Multipass diode-pumped solid-state optical amplifier", Opt. Lett. 18, 1420–1422, 1993) or pulsed mode (C. Larat, M. Schwarz, J. P. Pocholle; G. Feugnet, M. Papuchon, "High repetition rate solid-state laser for space communication", SPIE, Vol. 2381, 256–263). In these cases, the spectral distance between the emission lines of the two different materials, i.e. Nd:YAG and $Nd:YVO_4$, limits the small-signal gain to a value lower than that obtained when only $Nd:YVO_4$ is used in both the oscillator and the amplifier; the aforementioned spectral distance is comprised between 5.5 $cm^{-1}$ and 7.0 $cm^{-1}$ (J. F. Bernard, E. Mc Cullough, A. J. Alcock, "High gain, diode-pumped $Nd:YVO_4$ slab amplifier", Opt. Commun. Vol. 109, 109–114, 1994).

A number of amplification schemes using Nd ions in crystals have been studied, but often end up with complex multipass setups, with low efficiency due to transverse pumping.

End-pumped single-pass or double-pass amplification schemes based on guiding structures to increase the interaction length between the pump beam and the injected beam have been studied in the past: in planar guides (D. P. Shepherd, C. T. A. Brown, T. J. Warburton, D. C. Hanna and A. C. Tropper, "A diode-pumped, high gain, planar waveguide Nd:$Y_3Al_5O_{12}$ amplifier", Appl. Phys. Left., 71, 876–878, 1997) or in double-cladding fibers (E. Rochat, K. Haroud, R. Dandliker, "High power Nd-doped fiber amplifier for coherent intersatellite links", IEEE, JQE, 35, 1419–1423, 1999; I. Zawischa, K. Plaman, C. Fallnich, H. Welling, H. Zellner, A. Tunnermann, "All solid-state neodymium band single frequency master oscillator fiber power amplifier system emitting 5.5 W of radiation at 1064 nm", Opt. Lett. 24, p. 469–471, 1999). However, these schemes are not suited for high-peak-power pulses because unwanted nonlinear effects, such as the Raman effect, start to appear around 1 kW of peak power.

A high small-signal gain of 240 was achieved in an end-pumped double-pass bulk Nd:YLF amplifier, but it was used with a CW laser with an expensive diode-beam shaping optical setup (G. J. Friel, W. A. Clarkson, D. C. Hanna, "High gain Nd:YLF amplifier end-pumped by a beam shaped bread-stripe diode laser", CLEO 96, paper CTUL 28, p. 144, 1996).

U.S. Pat. No. 6,373,864, Georges et al., issued Apr. 16, 2002, incorporated herein by reference, discloses an entirely passive laser system both for the generation and amplification of short pulses. In the Georges et al. invention, the oscillator directly produces $\mu$J pulses at the required repetition rate, and the pulses are amplified after only a few passes in a non-synchronized amplifier. The uniqueness of that approach was to combine an optically pumped, passively Q-switched, high frequency, Nd:YAG microchip laser producing short pulses with an optically end-pumped Nd:$YVO_4$ amplifier producing high small-signal gain while pumped at low power. The use of the two materials, Nd:YAG and Nd:$YVO_4$, allowed the best use of their respective properties: Nd:YAG/$Cr^{4+}$:YAG microchip lasers are simpler and easier to manufacture than Nd:$YVO_4$ microchips because they use the same crystal (YAG) for the laser medium and the saturable absorber, and can be produced in a collective fashion. In addition they produce shorter pulses except in the case of the semiconductor saturable absorber described in B. Braun, F. X. Kartner, G. Zhang, M. Moser, U. Keller, "56 ps passively Q-switched diode-pumped microchip laser", Opt. Lett. 22, 381–383, 1997. Nd:$YVO_4$ is on the other hand well suited for amplification due to its high stimulated emission cross section. It is also better suited than Nd:YAG for higher repetition rates due to a shorter fluorescence lifetime (100 $\mu$s instead of 230 $\mu$s).

In the invention disclosed be Georges et al., the light beam to be amplified initially gets passed through the amplifier medium along a first path and subsequently gets reflected back through the amplifier medium along a second path, thereby traversing the amplifier medium twice. The planar geometry used by Georges et at is not optimal since the pump beam propagates in three dimensions whereas the light beam to be amplified travels in a single plane. This results in poor overlap between the volume occupied in the amplifier medium by the pump beam and the volume occupied in the amplifier medium by the light beam to be amplified. Georges et al. alludes to multi-pass scenarios wherein the light beam (to be amplified) traverses the amplifier medium at least twice. Such multi-pass amplification schemes are known. For instance, McIntyre discloses co-linear and two-dimensional multi-pass amplification schemes in U.S. Pat. No. 5,268,787, issued Dec. 7, 1993, which is incorporated herein by reference. Plaessmann et al., in U.S. Pat. No. 5,546,222, issued Aug. 13, 1996, which is incorporated herein by reference, discloses a multi-pass laser amplifier that uses optical focusing between subsequent passes through a single gain medium. The multi-pass laser amplification schemes disclosed by Plaessman et al. are all two-dimensional schemes, i.e. the multi-paths of the light beam traversing the amplifier medium all lie in a same plane. The number of optical components used in the embodiments taught by Plaessman et al. is relatively small and consequently, the alignment of said components is crucial in view of the multi-pass amplification scheme.

Three-dimensional amplification schemes are also known. C. LeBlanc et al., "Compact and efficient multi-pass Ti:sapphire system for femto-second chirped-pulse amplification at the terawatt level", Optics Letters, Vol. 18, No. 2, Pp. 140–142, Jan. 15, 1993, discloses a Ti:sapphire crystal amplifier medium pumped at two ends by Nd:YAG light and traversed eight times by the light beam to be amplified. The light beam to be amplified traverses the amplifier medium four times in a first plane and four other times in a distinct second plane parallel to the first plane. Another three-dimensional amplification scheme is that of Scott et al., "Efficient high-gain laser amplification from a low-gain amplifier by use of self-imaging multi-pass geometry", Applied Optics, Vol. 40, No. 15, Pp. 2461–2467, 20 May 2001. Scott et al. illustrates how the light beam to be amplified traverse the amplifier medium four times in a first plane and four additional times in a distinct other plane parallel to the first plane. A phase-conjugate mirror is then used to double the number of passes.

The three-dimensional amplification schemes discussed above are quite complex and not well suited for miniaturization.

SUMMARY OF THE INVENTION

An object of the invention is to provide a method for amplifying a light beam comprising the step of passing a light beam through an amplifying medium along multiple paths, wherein no more than two of the multiple paths lie in a same plane.

Accordingly, the present invention relates to an optical amplifier stage for amplifying a light beam comprising:
a first lens having a collimating end, a focusing end, an optical axis, and a focal point lying on the optical axis, the first lens for receiving the light beam at the collimating end for directing the light beam towards the focal point along a path $s_1$;
an amplifying medium disposed along the optical axis for amplifying the light beam propagating along $s_1$;
a reflector disposed for reflecting the light beam back through the amplifier medium towards the focusing end of the first lens along a path $s_2$ to amplify the light beam, wherein $s_1$ and $s_2$ lie in a same plane $P_1$;
N redirecting means $\{R_1, R_2, R_3, \ldots, R_N\}$, N being a natural number, disposed adjacent the collimating end of the lens;
wherein redirecting means $R_x$, x being a natural number between 1 and N, is for receiving the light beam having propagated along the path $s_{2x}$, and for redirecting the light beam through the first lens back through the amplifier medium along a path $s_{2x+1}$ to amplify the light beam;
wherein, $s_{2x+1}$ and $s_{2(x+1)}$ lie in a same plane $P_{x+1}$; and
wherein all the planes are distinct.

Another embodiment of the present invention relates to a laser system for emitting a pulsed light beam comprising:

a microchip laser for emitting pulsed laser radiation, said
microchip laser including:
two reflective elements defining an optical resonator for
laser radiation, a laser gain medium placed inside said
resonator and a saturable absorber medium placed
inside said resonator for passively Q-switching said
laser radiation, said reflective elements, said gain
medium and said saturable absorber medium being
rigidly and irreversibly bonded such as to form a
monolithic body, and
an optical pump source for emitting pumping radiation
which impinges on said monolithic body and excites
said gain medium to emit a pulsed laser radiation light
beam; and
an optical amplifier stage as defined above for amplifying
the pulsed laser radiation light beam;
wherein the microchip laser and the optical amplifier are
mutually arranged such that the laser radiation light beam
emitted by the microchip laser is amplified by the optical
amplifier.

Another feature of the present invention relates to an optical amplifier stage for amplifying a light beam comprising:
a first lens having a collimating end, a focusing end, an
optical axis, and a focal point lying on the optical axis,
the first lens for receiving the light beam at the collimating end, and for directing the light beam towards
the focal point;
an amplifying medium disposed along the optical axis for
amplifying the light beam traveling therethrough;
a reflector for reflecting the light beam back through the
amplifying medium towards the focusing end of the
first lens; and
at least one redirecting means disposed adjacent the
collimating end of the first lens, each redirecting means
for receiving the light beam from the reflector via the
amplifying medium and the lens, for laterally displacing the light beam, and for reflecting the light beam
back through the first lens and the amplifying medium
to the reflector;
wherein each time the light beam passes back and forth between the reflector and one of the redirecting means the light beam travels in a different plane through the amplifying medium.

Furthermore the present invention relates to a laser system for emitting a pulsed light beam comprising:
a microchip laser for emitting pulsed laser radiation, said
microchip laser having:
two reflective elements defining an optical resonator for
laser radiation, a laser gain medium placed inside said
resonator and a saturable absorber medium placed
inside said resonator for passively Q-switching said
laser radiation, said reflective elements, said gain
medium and said saturable absorber medium being
rigidly and irreversibly bonded such as to form a
monolithic body, and
an optical pump source for emitting pumping radiation
which impinges on said monolithic body and excites
said gain medium to emit a pulsed laser radiation light
beam; and
an optical amplifier stage as defined above for amplifying
the pulsed laser radiation light beam;
wherein the microchip laser and optical amplifier are mutually arranged such that the laser radiation light beam emitted by the microchip laser is amplified by the optical amplifier.

DETAILED DESCRIPTION OF THE INVENTION

Figure 1:
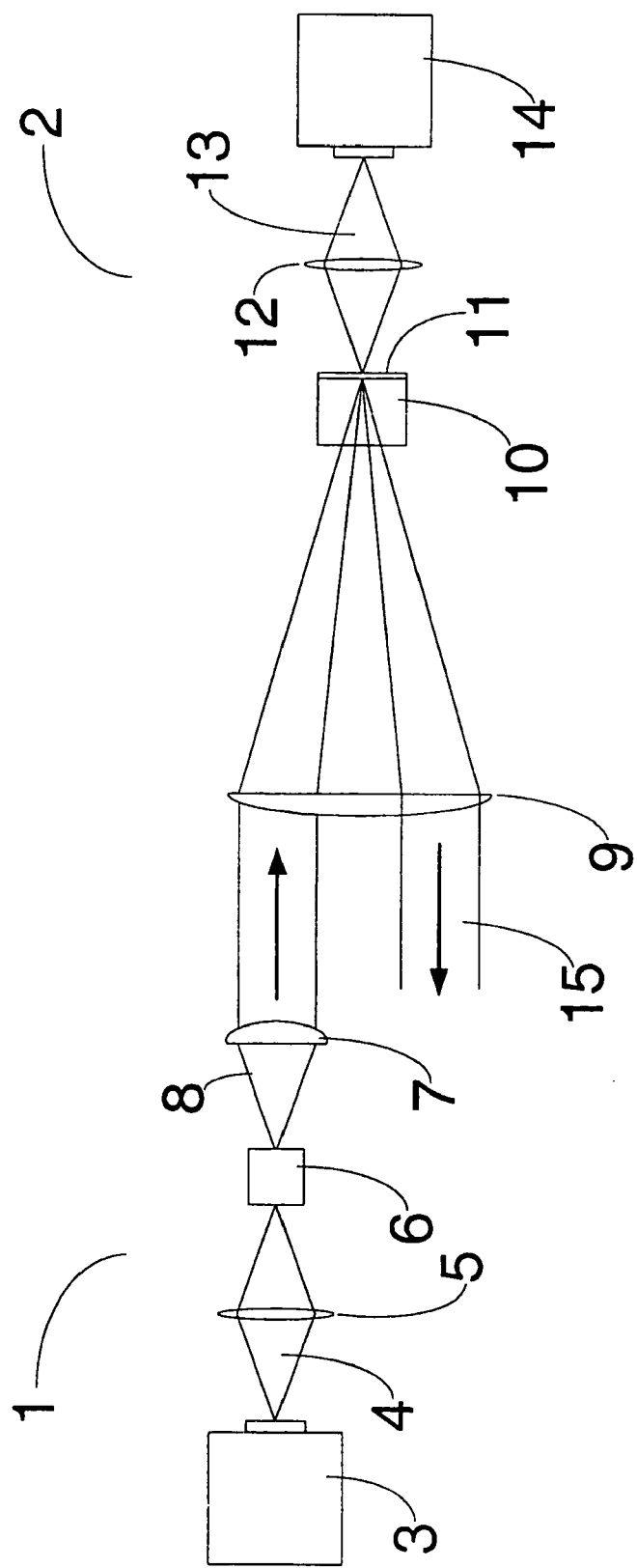
FIG. 1 is a schematic illustration of a prior art laser system.

FIG. 1 depicts a conventional entirely passive laser system for both the generation and amplification of short pulses, the full description of which is found in U.S. Pat. No. 6,373,864, issued to Georges et al. on Apr. 16, 2002. The Georges et al. laser system comprises a first sub-system; i.e. a microchip laser stage 1, and a second sub-system; i.e. an amplifier stage 2. In the microchip laser stage 1, a first pump laser 3 emits a first pumping radiation 4, which is directed by a first lens 5 towards a microchip laser 6. The microchip laser 6 comprises reflective elements, a first gain medium and a saturable absorber, all of which are not depicted. A microchip laser beam 8 is directed by lenses 7 and 9 towards an amplifying medium 10 which is optically pumped by a second pump laser 14, whose pumping radiation 13 is directed towards the amplifying medium 10 by a lens 12. A dichroic filter 11, transparent to pumping radiation 13 and reflective to the microchip laser beam 8, is disposed at an end of the amplifying medium 10. The pumping radiation 13, generated by pump laser 14, is transmitted through the dichroic filter 11 and excites the amplifier medium 10, while the microchip laser beam 8, traversing the amplifying medium 10 a first time for a first amplification, is reflected by the dichroic filter 11 back through the amplifying medium 10 a second time for a second amplification. A twice-amplified microchip laser beam 15 is directed by lens 9 to an optical circuit (not shown).

Figure 2A:
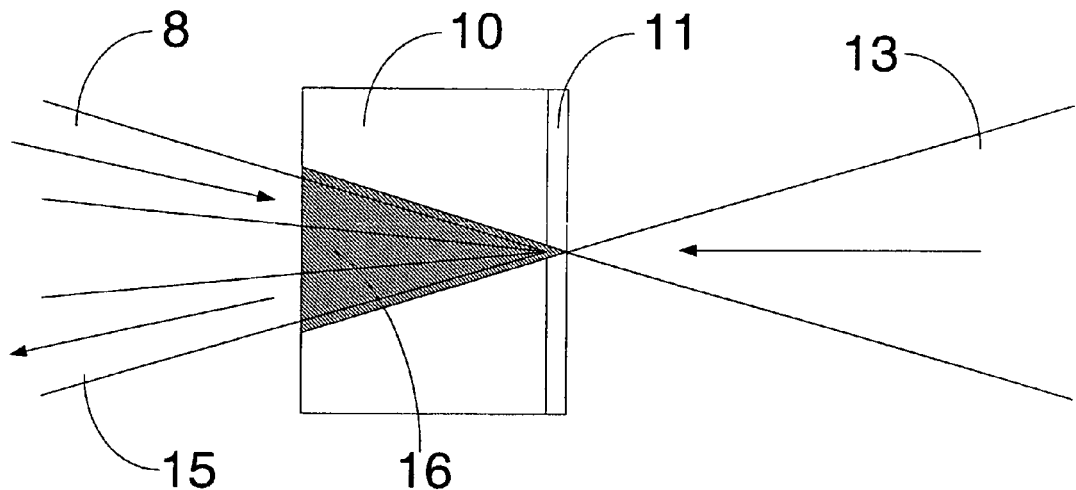
FIGS. 2a and 2b is a schematic illustration of a prior art optically pumped amplifier structure.
Figure 2B:
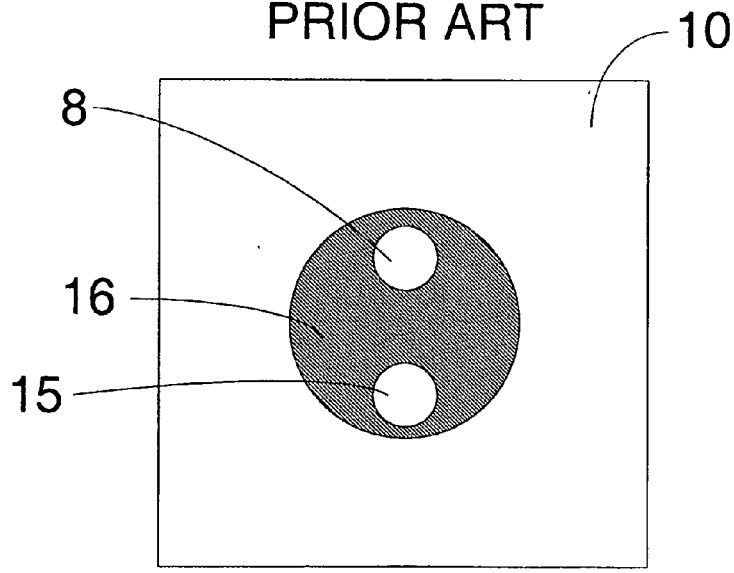

FIGS. 2a and 2b illustrate the amplifying medium 10 being pumped by the pumping radiation 13. Shaded area 16 depicts a cross-sectional view of the volume being optically pumped by the pumping radiation 13. It is apparent from FIGS. 2a and 2b that the optically pumped volume 16 of the amplifying medium 10 is not being substantially overlapped by the microchip laser beam 8 and the twice-amplified microchip laser beam 15.

The present invention addresses the poor overlap situation by disclosing a three-dimensional amplification scheme that sees the beam to be amplified travel along multiple paths inside the amplifier medium with the combined volume occupied by the multiple paths inside the amplifier medium substantially overlapping with the volume occupied by the optical pump beam. This provides a laser system with high gain and good efficiency.

Figure 3:
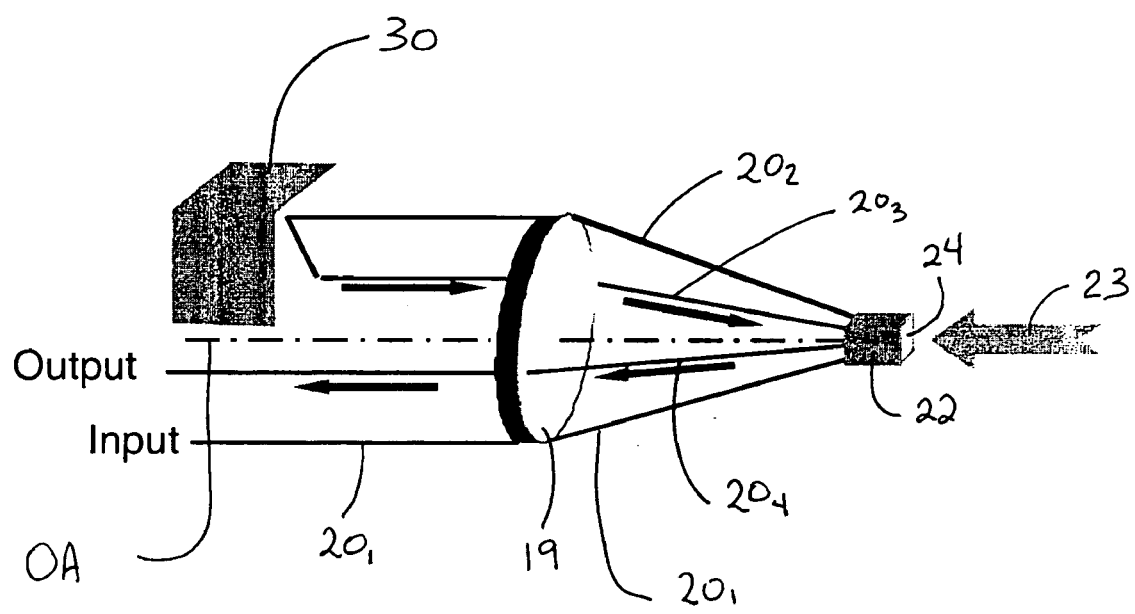
FIG. 3 is a schematic illustration of an embodiment of the present invention; and,
FIG. 4 is a cross-sectional view of an amplifier medium of the embodiment of FIG. 3.
Figure 4:
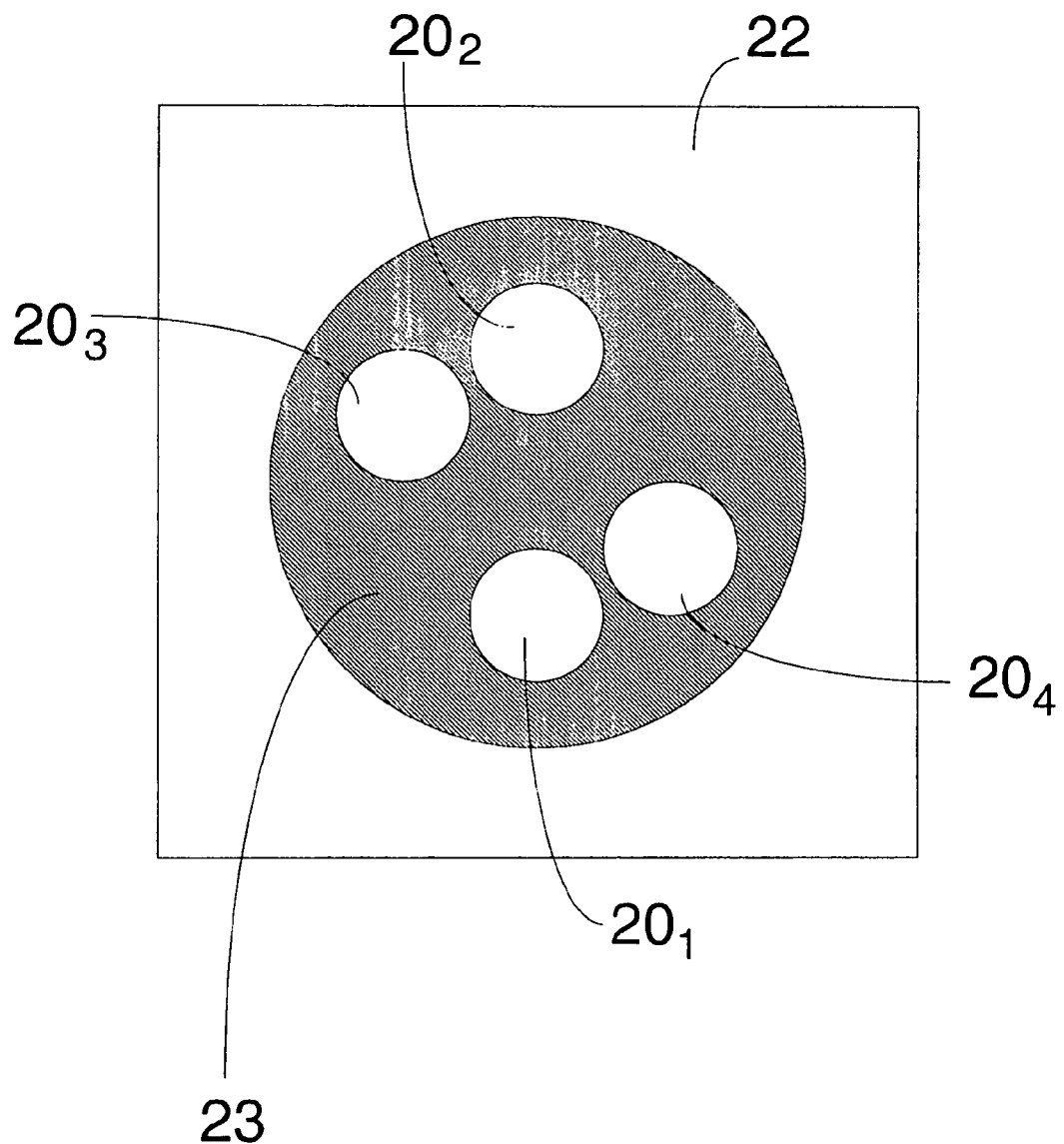

FIG. 3 depicts a preferred embodiment of the present invention. A beam of light to be amplified $20_1$ propagates parallel to the optical axis (OA) of a lens 19 and is directed by the lens 19 towards an amplifier medium 22, which is being optically pumped at a wavelength $\lambda_p$ by a pump beam 23 through a dichroic filter 24 transparent to $\lambda_p$. The beam $20_1$, having a wavelength $\lambda_1$, traverses the amplifier medium 22 for a first time along a first path for a first amplification and is reflected by the dichroic filter 24. The reflected beam $20_2$ traverses the amplifier medium a second time for a second amplification along a second path and is directed by the lens 19 towards a reflector in the form of a corner cube 30. The corner cube 30 displaces the beam $20_2$ into a displaced beam $20_3$ and reflects the beam $20_3$ back towards the lens 19, which directs the beam $20_3$ along a third path towards the amplifier medium 22 for a third amplification. The dichroic filter 24 reflects the beam a second time and the reflected beam $20_4$ traverses the amplifier medium for a fourth amplification along a fourth path. Subsequently, the beam $20_4$ is directed towards an output port, preferably via the lens 19. It is important to note that the plane defined by the first and second paths and the plane defined by the third and fourth paths are distinct due to the beam-displacing action of the corner cube 30. Having distinct planes imply that the combined volume occupied by the beam paths inside the amplifier medium 22 is greater than it would be were it not for the presence of the corner cube 30. FIG. 4 shows a cross-sectional view of the amplifier medium 22 and a pump beam area 23 populated by areas occupied by the light beam to be amplified as it propagates along the first, second, third and fourth paths here labeled by the corresponding beam numerals $20_1$, $20_2$, $20_3$ and $20_4$. Although the embodiment just described has the input beam $20_1$ and the output beam $20_4$ traversing the lens 19, it is not necessary that they do so for the invention to work.

Figure 5:
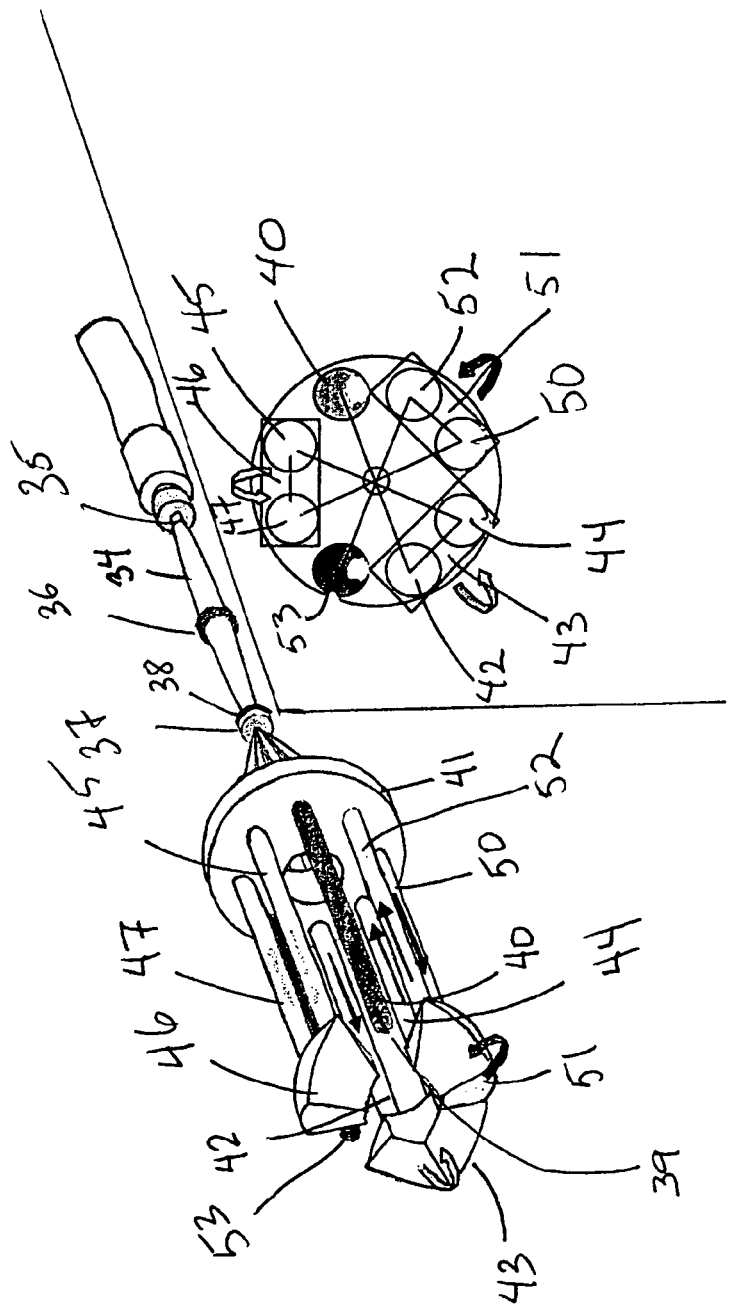
FIG. 5 is a schematic illustration of an alternative embodiment of the present invention.

FIG. 5 depicts an alternative embodiment of the present invention, in which an output pump beam 34 of a fiber coupled diode array 35 is imaged by a lens 36 on an amplifier medium 37 through a dichroic filter 38. A light beam to be amplified 39 propagates along a first path 40 towards a lens 41, which directs the beam 39 towards the amplifier medium 37 and the dichroic filter 38. The dichroic filter 38 reflects the light beam 39 back through the amplifier medium 37 and towards the lens 41, which directs beam 39 along a second path 42 to a first roof prism 43. The roof prism 43 reflects and displaces the beam 39 to propagate along a third path 44 towards the lens 41, which directs the beam 39 towards the amplifier medium 37 and the dichroic filter 38. Again, the dichroic filter 38 reflects the beam 39 for propagation through the amplifier medium 37 and towards the lens 41, which directs the beam 39 along a fourth path 45 to a second roof prism 46. The roof prism 46 reflects and displaces the beam 39 to propagate along a fifth path 47 towards the lens 41, which directs beam 39 through the amplifier medium 37 to the dichroic filter 38. Once more, the dichroic filter 38 reflects the beam 39 through the amplifier medium 37 and the lens 41, which directs the beam 39 along a sixth path 50 to a third roof prism 51. The roof prism 51 reflects and displaces the beam 39 to propagate along a seventh path 52 towards the lens 41, which directs beam 39 through the amplifier medium 37 to dichroic filter 38. Again, the dichroic filter 38 reflects the beam 39 for propagation through the amplifier medium 37 and towards the lens 41, which directs the beam 39 along an eight path 53 towards an output port (not shown). The beam 39 is amplified each time it traverses the amplifier medium 37 and consequently, according to the description just given, is amplified eight times.

Figure 6:
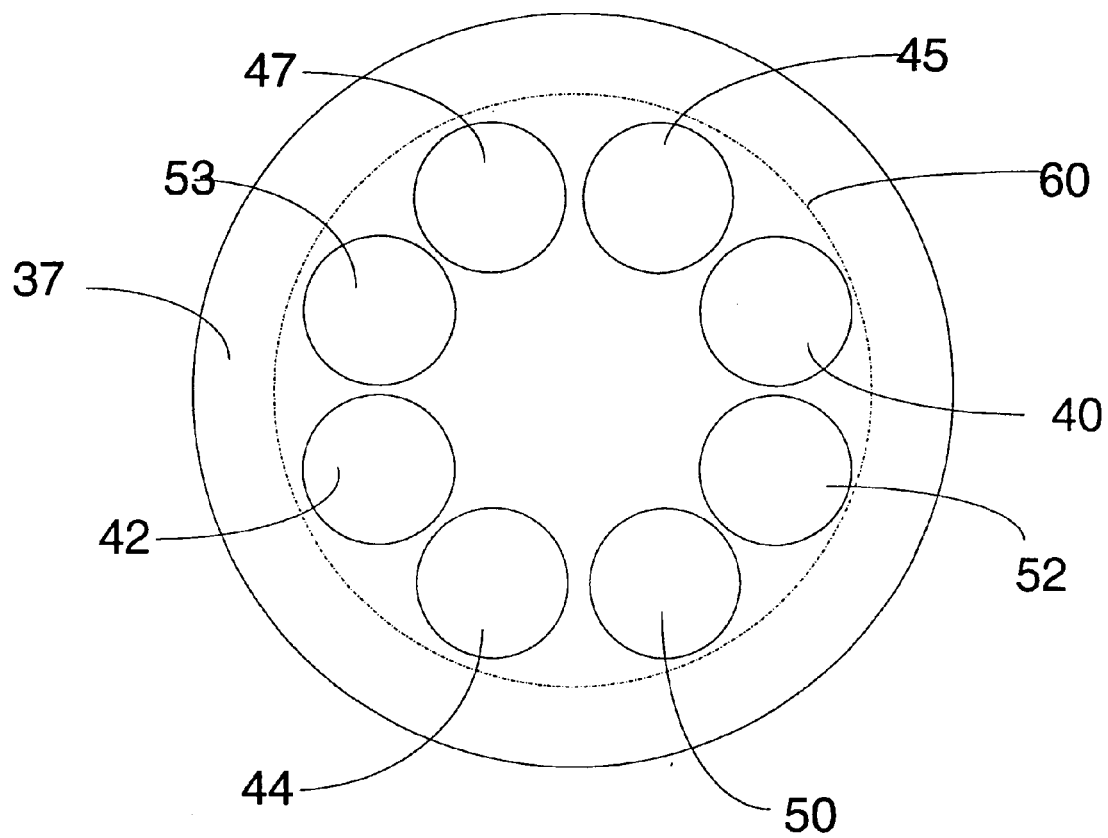
FIG. 6 is a cross-sectional view of an amplifier medium of the embodiment of FIG. 5.

FIG. 6 shows a cross-sectional view of the amplifier medium 37 with a concentric dashed circle 60 representing the area of the cross-section being optically pumped by the pump beam 34. Also shown in FIG. 6 are the areas of beam 39 traveling along the various paths 40, 45, 47, 53, 42, 44, 50, and 52 as they intercept the cross-section of the pump beam. One can observe in FIG. 6 that the area covered by beam paths 40, 45, 47, 53, 42, 44, 50, and 52 substantially overlap the area 60 covered by the pump beam 34.

Figure 7A:
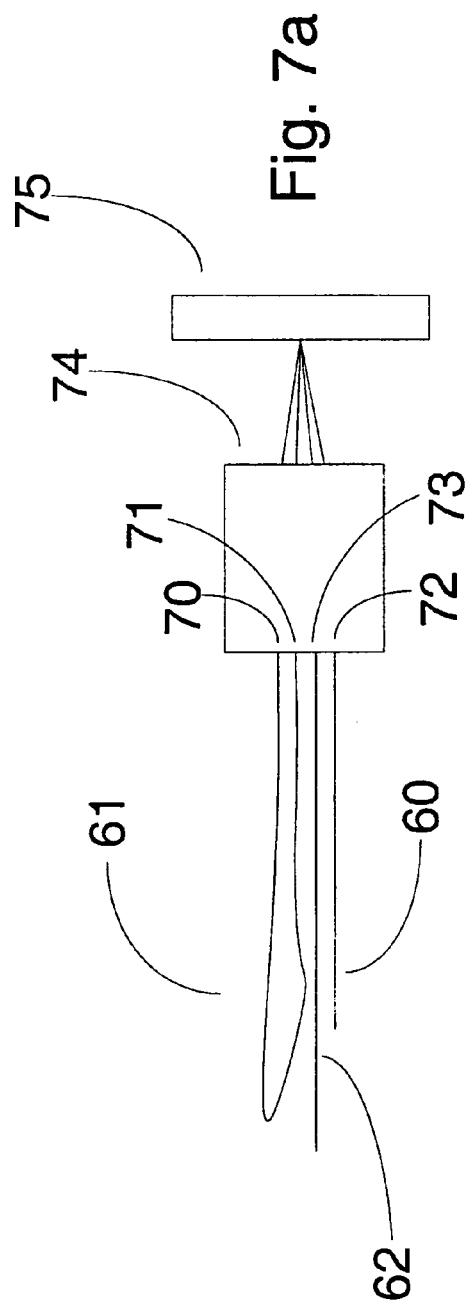
FIGS. 7a and 7b are schematic illustrations of a redirecting means in the form of a recirculating fiber.
Figure 7B:
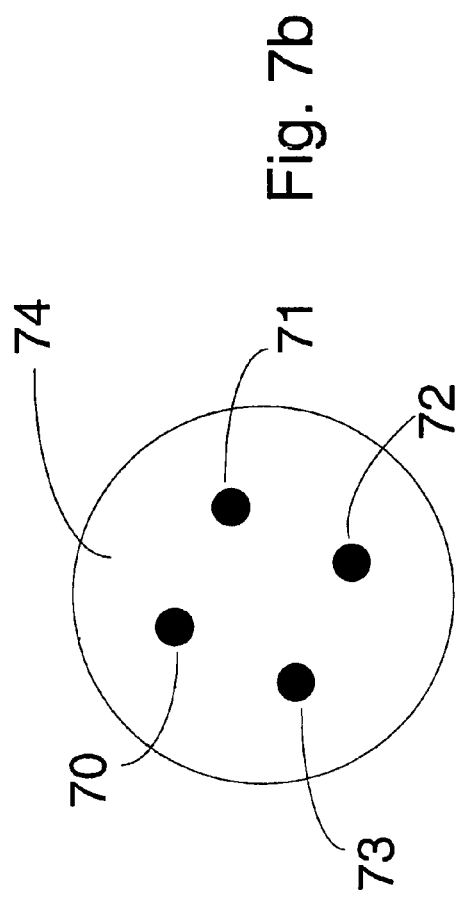

It should be clear to those skilled in the art that the corner cube of the former embodiment and the roof prisms of the latter embodiment can be replaced by a number of equivalent redirecting means. Such alternative redirecting means include recirculating fiber and mirrors. For example, FIG. 7a illustrates how a recirculating fiber 62 can be used to replace the roof prisms or the corner cube of the previously described embodiments. In FIG. 7a, a beam of light 60 propagates towards a lens 74, intersects the lens 74 at a port 72 and is directed along a first path by the lens 74 towards a reflector 75. The beam 60 is then reflected towards the lens 74 along a second path by the reflector 75 and is directed by the lens 74 towards a first end of a recirculating fiber 61, said first end located at port 70. The beam 60 propagates through the recirculating fiber 61 and exits the recirculating fiber 61 at port 71. The beam 60 is then directed along a third path by the lens 74 towards the reflector 75. The beam 60 is then reflected towards the lens 74 along a fourth path by the reflector 75 and is directed by the lens 74 towards a port 73. The beam of light 60 then exits the port 73 as an output beam 62. In FIG. 7a, the first and second paths form a first plane, the third and fourth paths form a second plane and the first and second planes are distinct. Since FIG. 7a was meant to illustrate how a recirculating fiber can serve as a redirecting means equivalent to corner cubes and roof prisms, the amplifier medium present in the aforementioned embodiments was left out. FIG. 7b is frontal view of the side of the lens 74 having the ports 70, 71, 72 and 73.

Figure 8A:
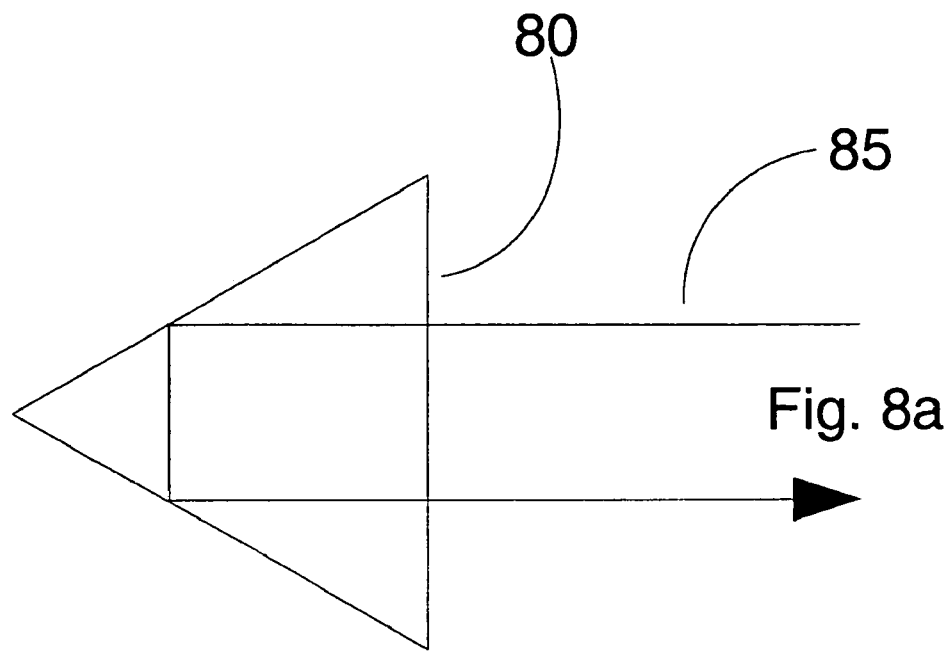
FIGS. 8a and 8b are schematic illustrations showing the equivalent performance of a roof prism compared to two mirrors.
Figure 8B:
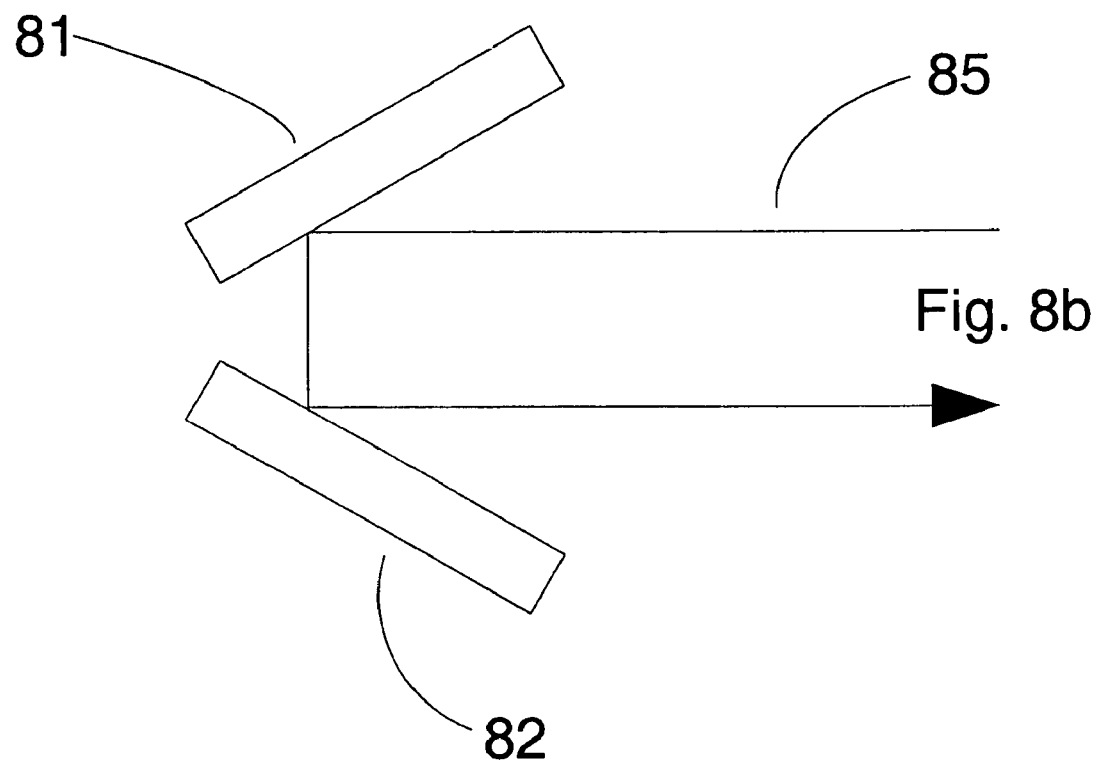

As another example of redirecting means, FIGS. 8a and 8b show how mirrors can perform the equivalent task of a roof prism. In FIG. 8a one can see an optical beam 85 entering a roof prism 80 and being redirected by the roof prism 80. FIG. 8b shows how the two mirrors 81 and 82 perform the same function as the roof prism 80 on the beam 85. Although not illustrated, one will understand that a combination of mirrors can function as a corner cube.

Many types of amplifier medium can be envisaged in the present invention. Amongst others, $Nd:YVO_4$, Nd:YAG, Yb:YAG, Er:glass and Yb:glass can all be utilized as the amplifier medium. However, to obtain the highest gain with the best efficiency, an a-cut Neodymium doped Vanadate ($Nd:YVO_4$) crystal is the preferred choice for the amplifier medium, because of a large stimulated cross-section and a strong broadband absorption at 809 nm. Since $YVO_4$ is an anisotropic crystal, the gain therefrom is polarization dependent, i.e. the polarization state of the signal beam must be maintained and aligned parallel with the crystallographic c axes of the crystal during each amplification stage. In the multi-pass scheme, according to the present invention, a prism is preferred to a corner cube as a reflector, since a prism can withstand higher power and higher energy beams. Therefore, to maintain the polarization of the signal beam constant, the prism and the $YVO_4$ crystal must be carefully aligned.

Figure 10:
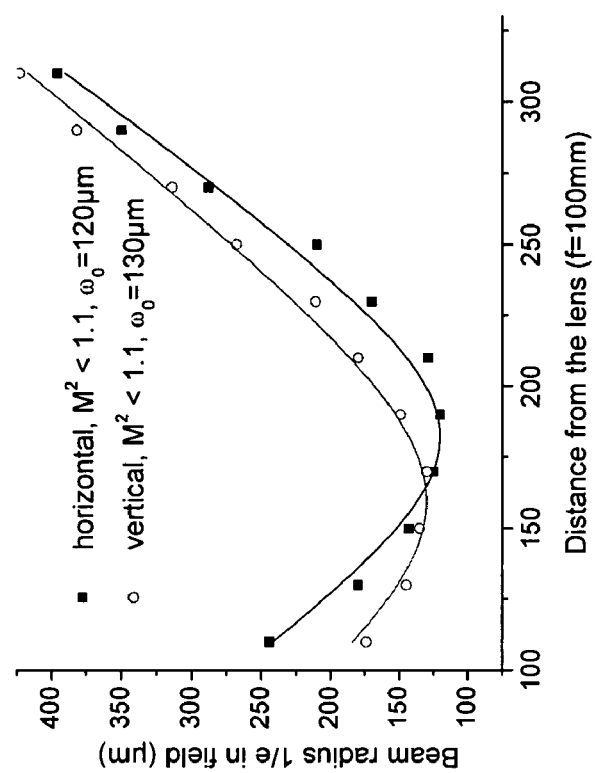
FIG. 10 is a plot of horizontal and vertical beam radii vs distance from the lens for the embodiment of FIG. 3.
Figure 9:
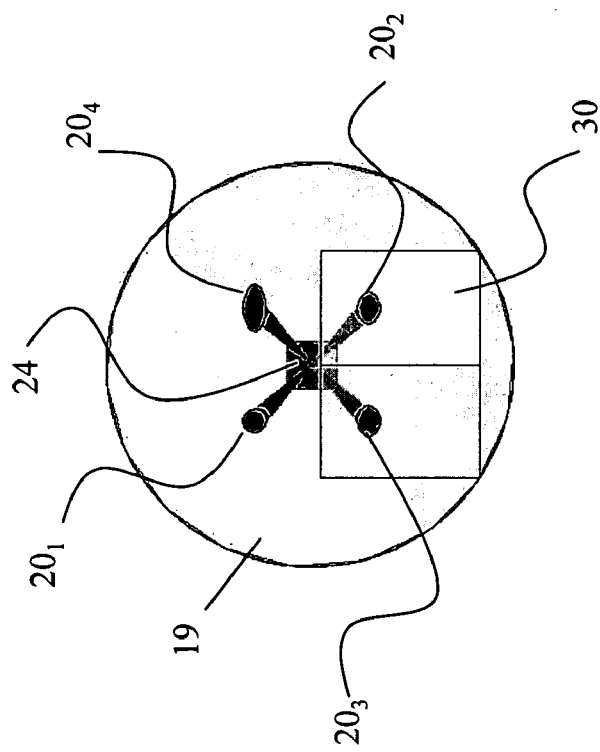
FIG. 9 is an end view of the embodiment of FIG. 3 with an anisotropic amplifier medium.

Unfortunately, since the $YVO_4$ crystal is anisotropic, propagation along the crystallographic a-axis exhibits a different thermal conductivity along the crystallographic b-axis (equivalent to a-axis in a uniaxial $YVO_4$ crystal) than along the crystallographic c-axis (equivalent to an optical axis in a uniaxial $YVO_4$ crystal). Since the crystal is primarily cooled from the sides, the absorbed pump power creates an anisotropic variation of the indices, which results in an anisotropic thermal lens, i.e. the focal length along the two transverse axes (horizontal and vertical) is different. As a consequence, a beam propagating in the amplifier medium 23 will undergo anisotropic focusing during each pass, and become elliptical and astigmatic. With reference to FIG. 9, after two passes the beam $20_2$ becomes somewhat elliptical, but after four passes the beam $20_4$ is clearly much broader along the horizontal axis than the vertical axis. The horizontal (or major) axis of the beam corresponding to the b-axis of the crystal 23 and the longitudinal axis of the corner cube 30, i.e. the direction in which the light travels from one facet of the corner cube 30 to the other. The graph in FIG. 10 illustrates the difference in beam radius along the horizontal and vertical axes at distances from the lens 19.

To compensate for astigmatism induced by anisotropic thermal lensing in laser cavities, the image of the beam is rotated by 90° between each pass, whereby the elliptical focusing acts in perpendicular directions for consecutive passes, i.e. the axis of the beam experiencing more broadening during the first pass will receive less broadening during the second pass, thereby recovering a circular profile. Unfortunately, this technique requires a ring cavity to enable multiple passes in the gain medium, which, thus far, has prevented its use in amplifiers.

Alternatively, the astigmatism can be compensated after the beam has exited the amplifier using various combinations of lenses to refocus the elliptical astigmatic beam back into a circular profile. However, such lensing solutions require difficult alignment procedures, and vary from laser to laser, because they are very sensitive to variations in the astigmatism. Moreover, such compensation does not operate for various power levels, since the thermal lens and the corresponding astigmatism vary with the absorbed pump power.

Figure 11:
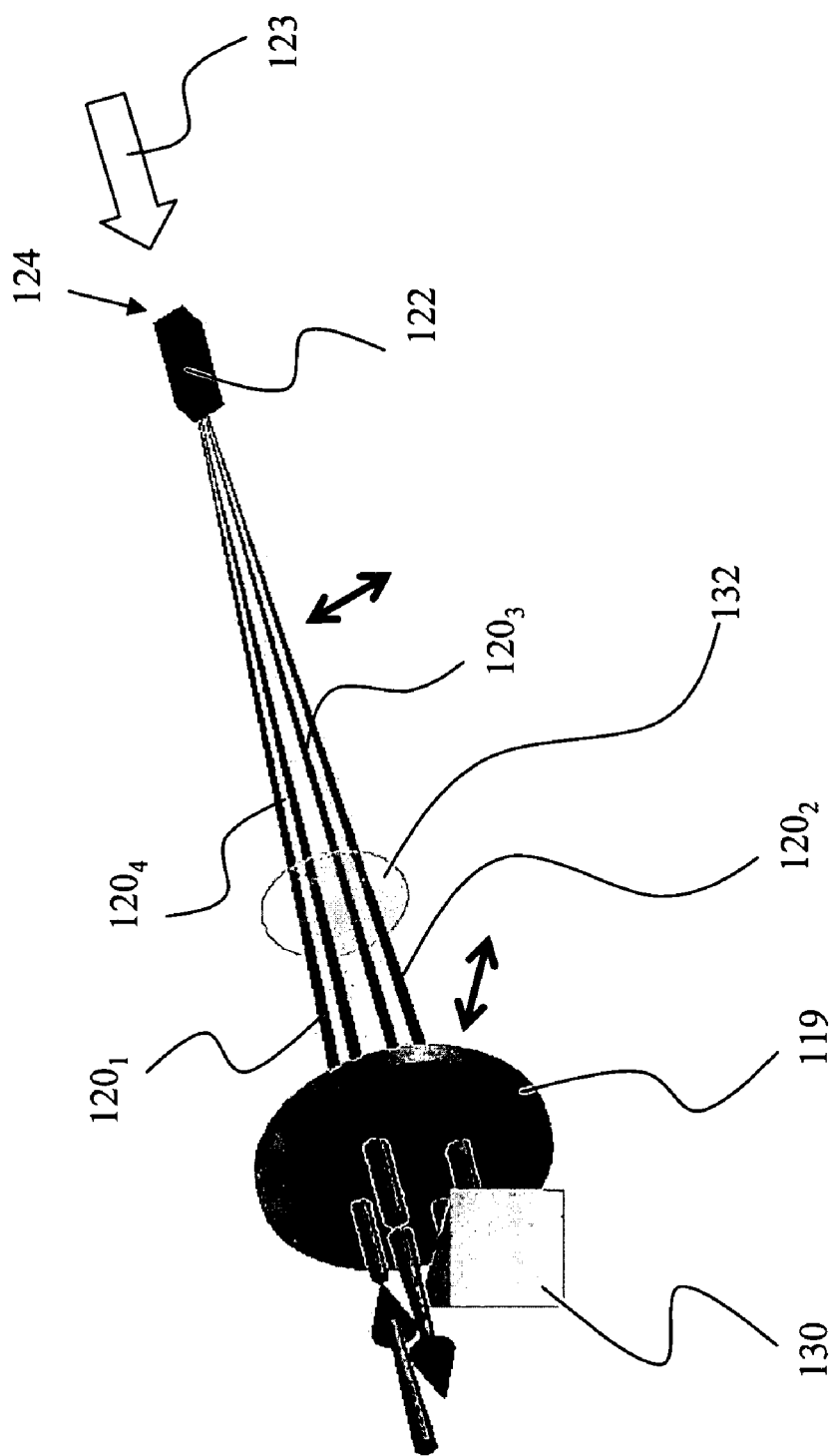
FIG. 11 is an alternative embodiment of an amplifier according to the present invention.

FIG. 11 illustrates an alternative embodiment of the present invention, similar to the embodiment of FIG. 3, in which a lens 119 directs an input beam $120_1$ along a first path through an amplifier medium 122, which is being optically pumped at a wavelength $\lambda_p$ by a pump beam 123 through a dichroic filter 124 transparent to $\lambda_p$. The dichroic filter 124 reflects the input beam $120_1$ back through the amplifier medium 122 along a second path forming reflected beam $120_2$. A redirecting means, preferably in the form of a right angle prism 130, creates a lateral displacement of the reflecting beam $120_2$ and redirects the reflected beam $120_2$ back through the amplifier medium 122 along a third path as redirected beam $120_3$, which gets reflected by the dichroic filter 124 forming output beam $120_4$ traveling along a fourth path. As in FIG. 3, the plane defined by the first and second paths and the plane defined by the third and fourth paths are distinct due to the beam-displacing action of the prism 130. Having distinct planes implies that the combined volume occupied by the beam paths inside the amplifier medium 122 is greater than it would be were it not for the presence of the prism 130. The prism 130 is defined by a longitudinal (or displacement) axis LA along which the light travels when being displaced, e.g. reflected from total internal reflection (TIR) surface of the prism 130 to another, and a transverse axis TA defined by the intersection of the two TIR planar surfaces.

Figure 12B:
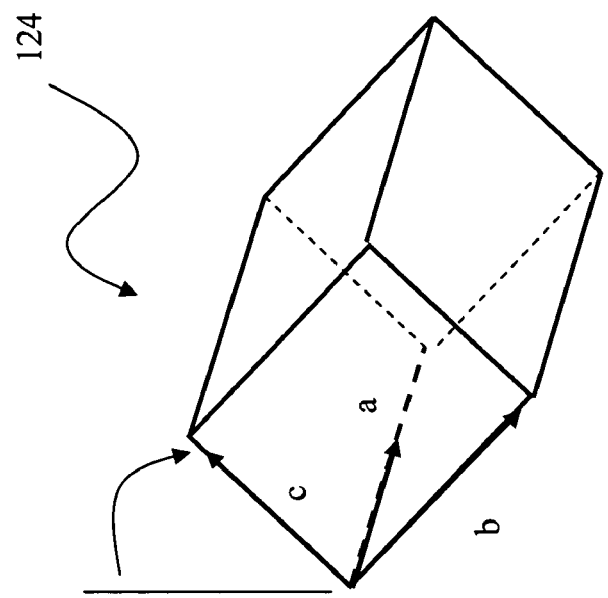
FIG. 12b illustrates the alignment of the crystal in the embodiment of FIG. 11.
Figure 12A:
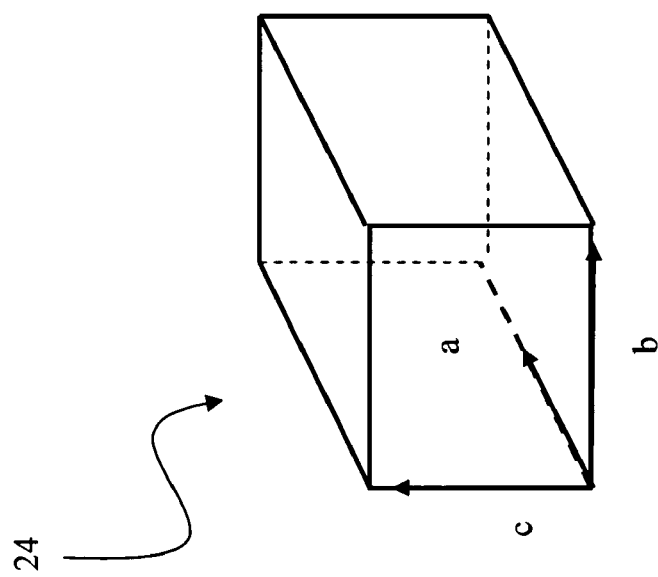
FIG. 12a illustrates the alignment of the crystal in the embodiment of FIG. 3.
Figure 14:
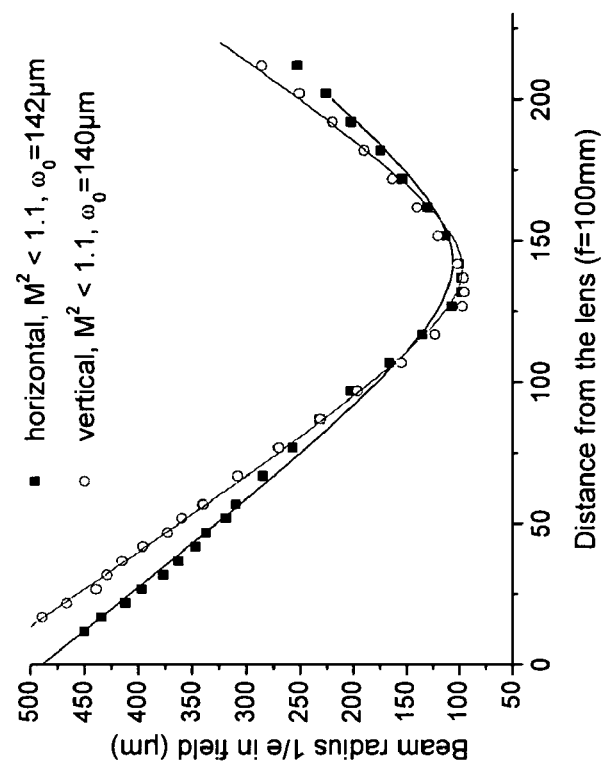
FIG. 14 is a plot of horizontal and vertical beam radii vs distance from the lens for the embodiment of FIG. 11.
Figure 13:
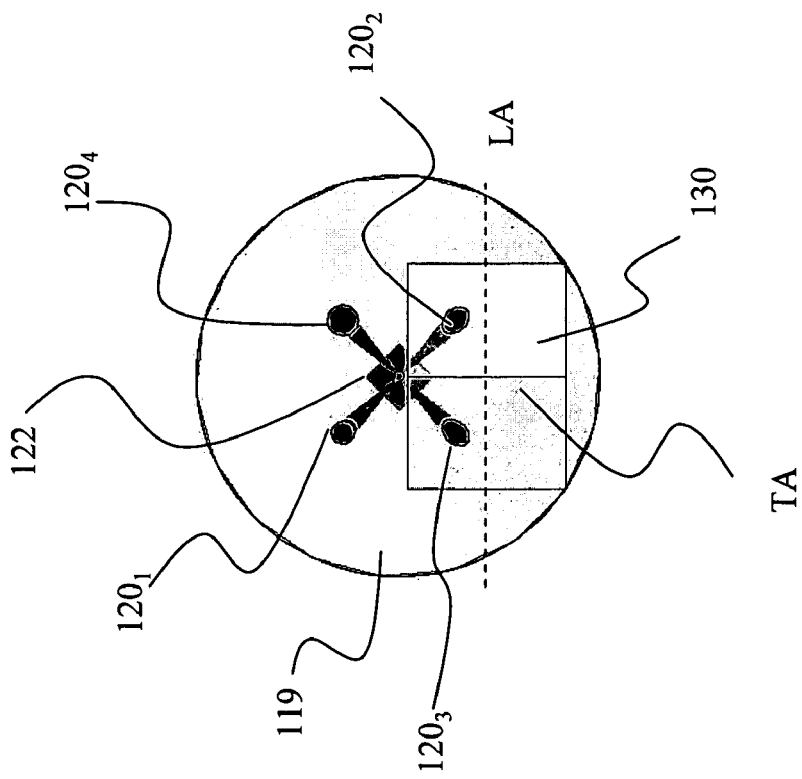
FIG. 13 is an end view of the embodiment of FIG. 11.

With reference to FIGS. 12a and 12b, to compensate for the astigmatism caused by an amplifier medium 122 comprising an anisotropic crystal, e.g. $YVO_4$, the c-axis (and/or b-axis) of the crystal is rotated by an acute angle relative to the longitudinal and transverse axes LA and TA, respectively, of the prism 130, e.g. by 40° to 50°, preferably 45°. Accordingly, with reference to FIG. 13, after two passes through the amplifier medium 122, the beam $120_2$ is slightly elliptical with the major and minor axes along diagonal lines, which are at the angle or rotation, e.g. 40° to 50°, to the longitudinal and transverse axes of the prism 130, whereby, when the beam is flipped, i.e. mirror imaged, by the prism 130, the major and minor axes of the beam $120_3$ will be effectively rotated by 90°. Therefore, during the third and fourth passes through the amplifier medium 122, the tighter focusing will be applied to the major axis of the elliptical beam, i.e. the astigmatism in the anisotropic crystal will be self compensating, thereby restoring the circular beam profile. A plot of the beam radii along the major and minor axes according to the embodiment of FIG. 11 is found in FIG. 14, which when compared to that of FIG. 10, illustrates that the beam output beam $120_4$ is much closer to circular than in the previous embodiment.

In order to maximize amplification in the amplifier medium 122, a half-wave plate 132 is positioned in the first path to rotate the polarization of the input beam $120_1$ corresponding to the rotation angle of the crystal of the amplifier medium 122, e.g. by 40° to 50°, preferably 45°, back into alignment with the proper axis, e.g. the c-axis for the $YVO_4$ example. To maximize the amplification efficiency, the half-wave plate 132 is positioned in each of the first, second, third and fourth paths, as in FIG. 11, whereby the polarization of the beams of light $120_1$ to $120_4$ will continually be rotated between its original state, when incident upon the redirecting means (e.g. prism 130) and the optimum state for the amplifier medium 122, when entering the amplifier medium 122. Accordingly, when the redirecting means is a prism, the polarization of the light beams $120_1$ to $120_4$ is selected parallel to the longitudinal axis LA of the prism 130, thereby to avoid depolarization during total internal reflection therein. Assuming the light beam $120_1$ is horizontally polarized, the polarization of the light beams $120_1$ to $120_4$ will rotate between horizontally polarized on the prism side of the half-wave plate 132 to having a 45° polarization on the amplifier medium side of the half-wave plate 132.

Because the astigmatism is self-compensated through image rotation inside the redirecting means, e.g. the prism 130, the amplifier according to the present invention works independently of the absorbed pump power and of the heat dissipation from the lateral sides of the amplifier medium 122. Accordingly, the amplifier according to the present invention can be operated at virtually any output power, while preserving optimum beam quality. Moreover, aging of the pump diode will not degrade the roundness of the beam.

Figure 15:
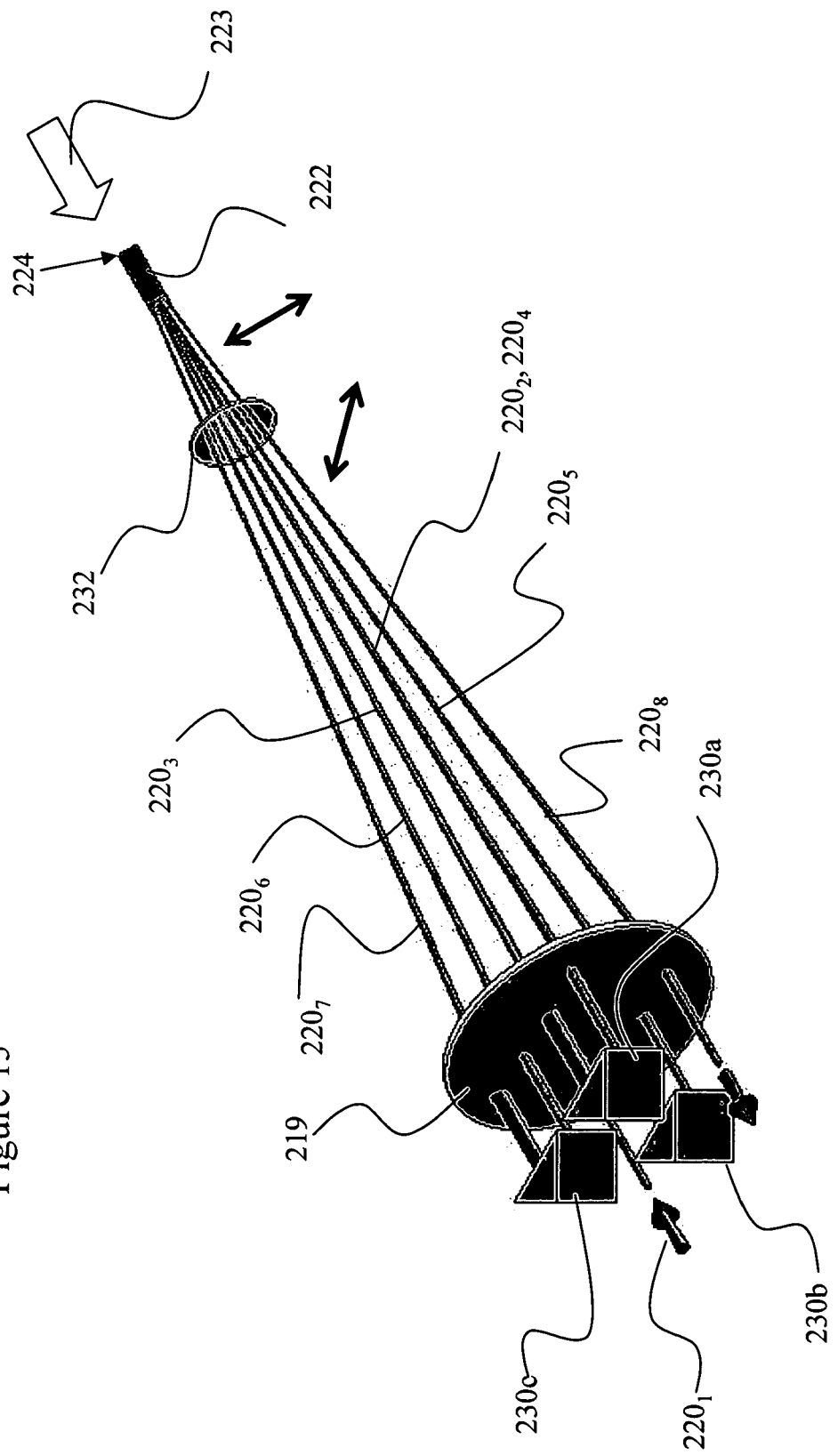
FIG. 15 an alternative embodiment of the present invention with eight passes through the amplifier medium.
Figure 16:
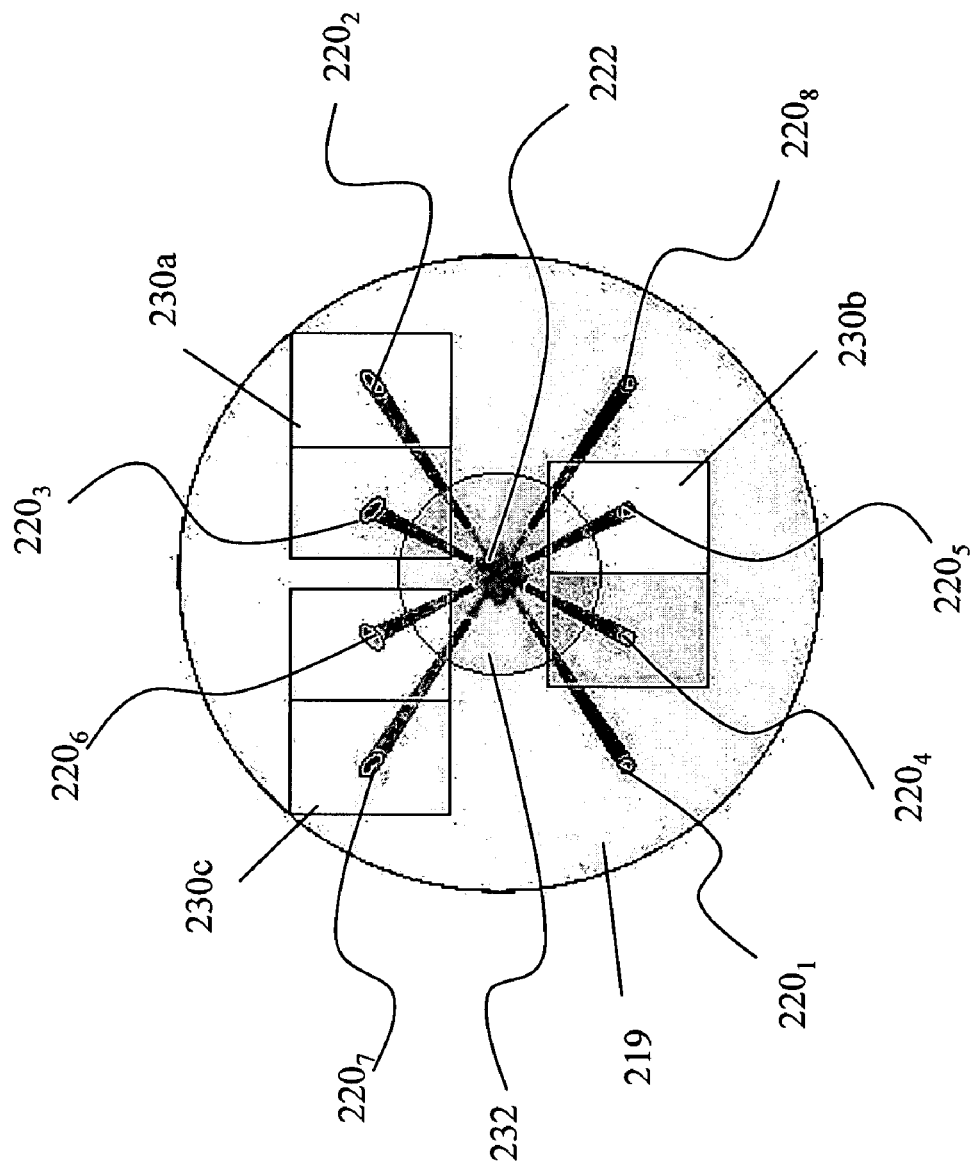
FIG. 16 is an end view of the embodiment of FIG. 15.

In an eight-pass arrangement, illustrated in FIGS. 15 and 16, an input beam $220_1$ is directed by a lens 219 through an amplifier medium 222, which is being optically pumped at a wavelength $\lambda_p$ by a pump beam 223 through a dichroic filter 224 transparent to $\lambda_4$. A first prism 230a laterally displaces and redirects a reflected beam $220_2$ traveling along a second path through the amplifier medium 222 back along a third path through the amplifier medium 222 forming redirected beam $220_3$. Subsequently, second and third prisms 230b and 230c redirect beams $220_4$ to $220_7$ traveling along fourth to seventh paths, respectively through the amplifier medium 222 until the output beam $220_8$ is directed out the output port. As above, the amplifier medium is comprised of an anisotropic crystal, e.g. Nd:YVO$_4$, with its axis rotated at an angle to the longitudinal axes of the first, second and third prisms 230a to 230c, respectively, whereby the astigmatism is self compensated during multiple passes therethrough. As above, each time the light is redirected by one of the prisms 230a to 230c, the major and minor axes of the elliptical beams are effectively rotated by 90°, whereby during the next two passes through the amplifier medium 223 the major axis undergoes more focusing than the minor axis, thereby recreating a circular beam profile. Any multiple of four passes through the amplifier medium 223 results in optimum compensation.

It is possible to devise embodiments other than the ones described here without departing from the spirit and scope of the present invention.

What is claimed is:

1. An optical amplifier stage for amplifying a light beam comprising:
    a first lens having a collimating end, a focusing end, an optical axis, and a focal point lying on the optical axis, the first lens for receiving the light beam at the collimating end for directing the light beam towards the focal point along a first path $s_1$;
    an amplifying medium disposed along the optical axis for amplifying the light beam propagating along the first path $s_1$;
    a reflector disposed for reflecting the light beam back through the amplifier medium towards the focusing end of the first lens along a second path $s_2$ to amplify the light beam, wherein the first path $s_1$ and the second path $s_2$ lie in a same plane $P_{1;\ and}$
    N redirecting means $\{R_1, R_2, R_3, \ldots, R_N\}$, N being a natural number, disposed adjacent the collimating end of the lens;
    wherein redirecting means $R_x$, x being a natural number between 1 and N, receives the light beam propagating along the path $s_{2x}$, and redirects the light beam through the first lens back through the amplifier medium along a path $s_{2x+1}$ to amplify the light beam;
    wherein, $s_{2x+1}$ and $s_{2(x+1)}$ lie in a same plane $P_{x+1}$; and
    wherein all the planes are distinct.

2. An optical amplifier stage as described in claim 1, further comprising an optical pump for pumping the amplifier medium with an optical pump beam;
    wherein the light beam is at a wavelength $\lambda_1$;
    wherein the pump beam is at a wavelength $\lambda_2$;
    wherein the reflector is substantially reflective at $\lambda_1$ and substantially transmissive at $\lambda_2$; and
    wherein the optical pump beam is transmitted through the reflector to optically pump the amplifying medium.

3. An optical amplifier stage as described in claim 2, further comprising a second lens for focusing the optical pump beam to a focal point located proximate the reflector, said optical pump beam diverging passed the focal point, wherein the optical pump beam transmitted through the reflector is for illuminating a pumping volume of the amplifying medium, said pumping volume being a function of focusing properties of the second lens; and
    wherein the paths are distributed in said pumping volume to substantially overlap with the pumping volume.

4. An optical amplifier stage as described in claim 3, wherein the focal point of the second lens is located between the second lens and the amplifying medium, whereby the pumping volume of the amplifier medium is in the form of a conical frustum.

5. An optical amplifier stage as described in claim 1, wherein each the redirecting means is selected from a group consisting of mirrors, roof prisms, and corner cubes defined by a longitudinal axis for providing a lateral displacement along the longitudinal axis.

6. An optical amplifier stage as described in claim 1, wherein said amplifying medium is selected from a group consisting of Nd:YVO$_4$, Nd:YAG, Yb:YAG, Er:glass and Yb:glass.

7. The optical amplifier stage as described in claim 5, wherein said amplifying medium comprises an anisotropic crystal defined by first, second and third crystallographic axes, with the light beam propagating along the first axis,
    wherein the second axis of the anisotropic crystal is oriented at an acute angle to the longitudinal axis of the amplifying medium.

8. The optical amplifier stage as described in claim 7, wherein the acute angle is between 40° and 50°.

9. The optical amplifier stage as described in claim 7, further comprising a polarization rotator for rotating the polarization of the light beam parallel to the second axis prior to entering the amplifying medium to maximize amplification therein.

10. The optical amplifier stage as described in claim 9, wherein the polarization rotator rotates the polarization of the light beam parallel to the longitudinal axis of each redirecting means prior to being incident thereon.

11. A laser system for emitting a pulsed light beam comprising;
    a microchip laser for emitting pulsed laser radiation, said microchip laser including:
    two reflective elements defining an optical resonator for laser radiation, a laser gain medium placed inside said resonator and a saturable absorber medium placed inside said resonator for passively O-switching said laser radiation, said reflective elements, said gain medium and said saturable absorber medium being rigidly and irreversibly bonded such as to form a monolithic body, and
    an optical pump source for emitting pumping radiation which impinges on said monolithic body and excites said gain medium to emit a pulsed laser radiation light beam; and
    an optical amplifier stage as defined in claim 1 for amplifying the pulsed laser radiation light beam;
    wherein the microchip laser and the optical amplifier are mutually arranged such that the laser radiation light beam emitted by the microchip laser is amplified by the optical amplifier.

12. An optical amplifier stage for amplifying a light beam comprising:
    a first lens having a collimating end, a focusing end, an optical axis, and a focal point lying on the optical axis, the first lens for receiving the light beam at the collimating end, and for directing the light bean towards the focal point;

an amplifying medium disposed along the optical axis for amplifying the light beam traveling therethrough;

a reflector for reflecting the light beam back through the amplifying medium towards the focusing end of the first lens; and at least one redirecting means disposed adjacent the collimating end of the first lens, each redirecting means for receiving the light beam from the reflector via the amplifying medium and the lens, for laterally displacing the light beam, and for redirecting the light back through the first lens and the amplifying medium to the reflector;

wherein each time the light beam passes back and forth between the reflector and one of the redirecting means the light beam travels in a different plane through the amplifying medium.

13. The optical amplifier stage as described in claim 12, further comprising an optical pump beam for pumping the amplifier medium, wherein the light beam is at a first wavelength and the pump beam is at a second wavelength; wherein the reflector is substantially reflective at the first wavelength and substantially transmissive at the second wavelength, whereby the pump beam is transmitted through the reflector to optically pump the amplifying medium.

14. The optical amplifier stage as described in claim 12, further comprising a second lens for focusing the optical pump beam to a focal point located proximate the reflector, said optical pump beam diverging passed the focal point, wherein the optical pump beam transmitted through the reflector is for illuminating a pumping volume of the amplifying medium, said volume being a function of the focusing properties of the lens;

wherein the paths are distributed in said pumping volume to substantially overlap with the pumping volume.

15. The optical amplifier stage as described in claim 14, wherein the focal point of the second lens is located between the second lens and the amplifying medium, whereby the pumping volume of the amplifier medium is in the form of a conical frustum.

16. The optical amplifier stage as described in claim 12, wherein each redirecting means is selected from the group consisting of mirrors, roof prisms and corner cubes, defined by a longitudinal axis, each redirecting means for providing a lateral displacement along the longitudinal axis.

17. The optical amplifier stage as described in claim 16, wherein said amplifying medium comprises an anisotropic crystal defined by first, second and third crystallographic axes, with the light beam propagating along the first axis;

wherein the second axis of the anisotropic crystal is oriented at an acute angle to the longitudinal axis of the amplifying medium.

18. The optical amplifier stage as described in claim 17, wherein the acute angle is between 40° and 50°.

19. The optical amplifier stage as described in claim 17, further comprising a polarization rotator for rotating the polarization of the light beam parallel to the second axis prior to entering the amplifying medium to maximize amplification therein.

20. The optical amplifier stage as described in claim 19, wherein the polarization rotator rotates the polarization of the light beam parallel to the longitudinal axis of each redirecting means prior to being incident thereon.

21. The optical amplifier stage as described in claim 12, wherein the amplifying medium is selected from a group consisting of $Nd:YVO_4$, Nd:YAG, Yb:YAG, Er:glass and Yb:glass.

22. A laser system for emitting a pulsed light beam comprising:

a microchip laser for emitting pulsed laser radiation, said microchip laser having:

two reflective elements defining an optical resonator for laser radiation, a laser gain medium placed inside said resonator and a saturable absorber medium placed inside said resonator for passively Q-switching said laser radiation, said reflective elements, said gain medium and said saturable absorber medium being rigidly and irreversibly bonded such as to form a monolithic body, and an optical pump source for emitting pumping radiation which impinges on said monolithic body and excites said gain medium to emit a pulsed laser radiation light beam; and an optical amplifier stage as defined in claim 12 for amplifying the pulsed laser radiation light beam;

wherein the microchip laser and optical amplifier are mutually arranged such that the laser radiation light beam emitted by the microchip laser is amplified by the optical amplifier.

* * * * *

UNITED STATES PATENT AND TRADEMARK OFFICE
CERTIFICATE OF CORRECTION

PATENT NO.        : 7,006,283 B2
APPLICATION NO. : 11/104026
DATED             : February 28, 2006
INVENTOR(S)       : Lefort et al.

It is certified that error appears in the above-identified patent and that said Letters Patent is hereby corrected as shown below:

Col. 3, line 57, "Georges et at" should read --Georges et al--

Col. 12, line 46, "passively O-switching" should read --passively Q-switching--

Col. 12, line 66, "light bean" should read --light beam--

Signed and Sealed this

Third Day of October, 2006

JON W. DUDAS
*Director of the United States Patent and Trademark Office*